United States Patent [19]
Robbins

[11] Patent Number: 5,367,773
[45] Date of Patent: Nov. 29, 1994

[54] RECHARGEABLE BATTERY-POWERED TREE PRUNING DEVICE

[76] Inventor: Everette P. Robbins, Rte. 1, Box 142-C, Hudson, N.C. 28638

[21] Appl. No.: 80,722

[22] Filed: Jun. 24, 1993

[51] Int. Cl.$^5$ ............................................. B26B 15/00
[52] U.S. Cl. ................................. 30/228; 30/245; 30/247; 30/249; 30/275.4; 30/277.4; 30/296.1; 30/DIG. 1
[58] Field of Search ................. 30/228, 296.1, 210, 30/180, 206, 215, 216, 227, 245, 247, 249, 264, 272.1, DIG. 1, 275.4, 277.4

[56] References Cited

U.S. PATENT DOCUMENTS

| | | | |
|---|---|---|---|
| 1,018,784 | 2/1912 | Scott | 30/247 |
| 1,375,091 | 4/1921 | Halicki | 30/166.3 |
| 1,423,506 | 7/1922 | Slothower | 30/166.3 |
| 1,660,764 | 2/1928 | Pidlisny | 30/216 X |
| 2,840,904 | 7/1958 | Hutchins | 30/228 X |
| 3,212,188 | 10/1965 | Riley et al. | 30/216 |
| 3,213,605 | 10/1965 | Welden | 30/228 X |
| 3,340,612 | 9/1967 | Knight | 30/394 |
| 3,401,455 | 9/1968 | Gebauer | 30/228 |
| 3,623,223 | 11/1971 | Edgell et al. | 30/220 |
| 3,715,805 | 2/1973 | Fraser | 30/166 |
| 3,721,004 | 3/1973 | Buckles | 30/228 |
| 3,757,194 | 9/1973 | Weber et al. | 30/228 X |
| 3,883,789 | 5/1975 | Achenbach et al. | 30/DIG. 1 X |
| 3,934,340 | 1/1976 | Jones et al. | 30/220 |
| 3,949,440 | 4/1976 | Guerra | 30/123.3 X |
| 3,952,239 | 4/1976 | Owings et al. | 30/DIG. 1 X |
| 3,958,331 | 5/1976 | Klebe, Jr. | 30/216 |
| 3,973,378 | 8/1976 | Bartasevich et al. | 30/218 X |
| 4,078,306 | 3/1978 | Schreitmüller | 30/204 |
| 4,084,123 | 4/1978 | Lineback et al. | 30/DIG. 1 X |
| 4,089,114 | 5/1978 | Doolittle et al. | 30/276 |
| 4,104,795 | 8/1978 | Lopic | 30/277.4 |
| 4,240,203 | 12/1980 | Johnson | 30/166.3 |
| 4,242,796 | 1/1981 | Barausch et al. | 30/166.3 |
| 4,249,313 | 2/1981 | Bates | 30/391 |
| 4,355,497 | 10/1982 | Murphy | 56/235 |
| 4,505,040 | 3/1985 | Everts | 30/296.1 |
| 4,644,654 | 2/1987 | Howe et al. | 30/296.1 |
| 4,916,818 | 4/1990 | Panek | 30/383 |
| 4,949,461 | 8/1990 | Van Der Merwe et al. | 30/245 |
| 4,991,298 | 2/1991 | Matre | 30/392 |
| 5,001,858 | 3/1991 | Frazar | 30/296.1 X |
| 5,077,902 | 1/1992 | Hitt | 30/394 |
| 5,131,150 | 7/1992 | Muehling | 30/166.3 |
| 5,140,249 | 8/1992 | Linder et al. | 30/DIG. 1 X |

FOREIGN PATENT DOCUMENTS

| | | | |
|---|---|---|---|
| 1262964 | 4/1961 | France | 30/247 |
| 365246 | 6/1962 | Switzerland | 30/247 |

*Primary Examiner*—Rinaldi I. Rada
*Assistant Examiner*—Clark F. Dexter
*Attorney, Agent, or Firm*—Cushman, Darby & Cushman

[57] ABSTRACT

A pruning device is provided which includes an elongate support member having distal and proximal ends. A cutting mechanism is pivotably mounted on the distal end of the support member and includes a cutting member. An actuating mechanism including a motor and a drive member is provided for actuating the cutting member. The device further includes structure for mounting the actuating mechanism on the support member near the proximal end thereof and structure for coupling the drive member to the cutting member whereby rotational movement of the actuating mechanism pivots the cutting member from an inoperative position to an operative position.

7 Claims, 2 Drawing Sheets

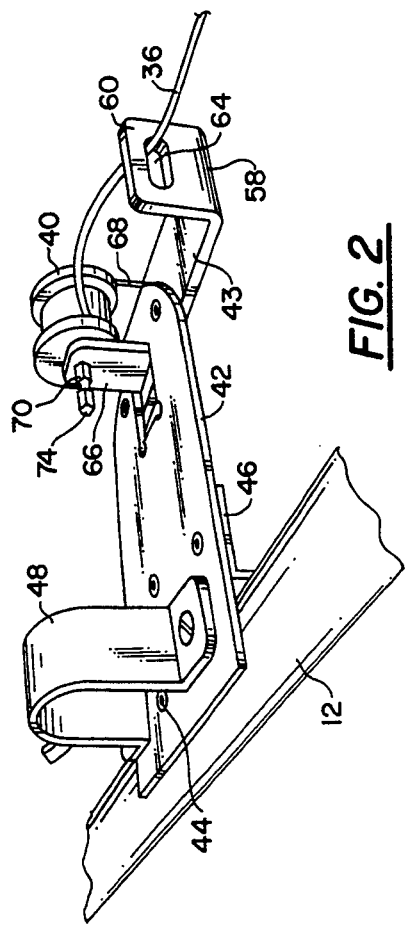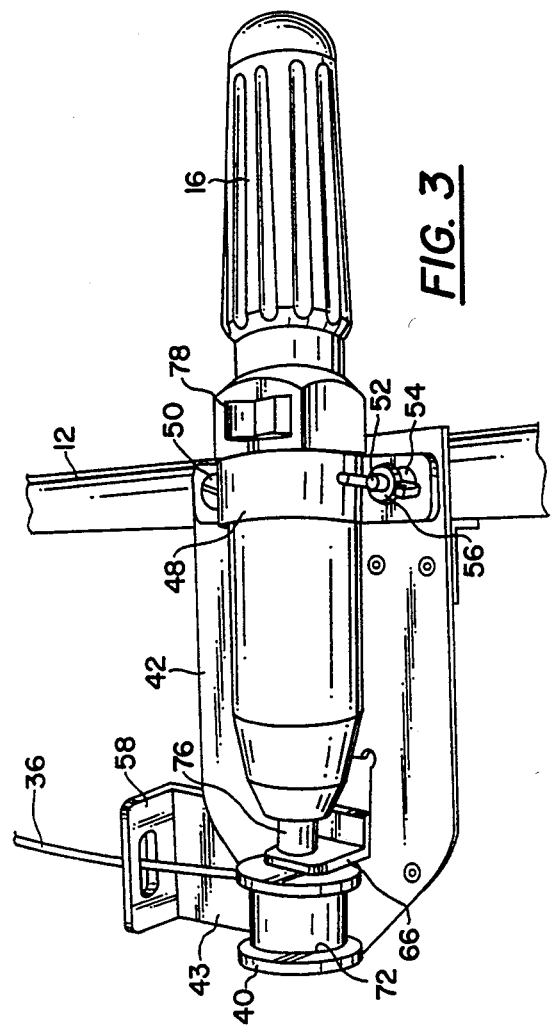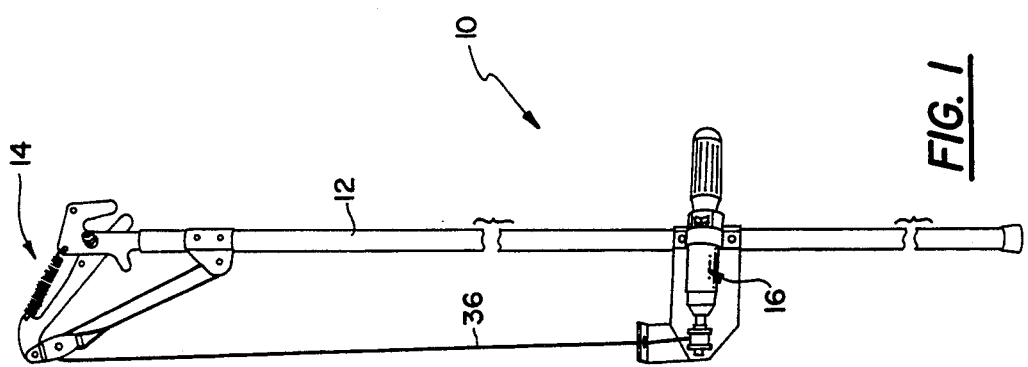

RECHARGEABLE BATTERY-POWERED TREE PRUNING DEVICE

BACKGROUND OF THE INVENTION

1. Field of the Invention

This invention relates to tree pruning devices and, in particular, to tree pruning devices which are operated at ground level to cut individual, overhead tree or shrub limbs.

2. Description of Related Art

Conventional tree pruning devices include a pole having a cutting member disposed at a distal end thereof. The cutting member includes a hook, having a counter cutting surface, which is positioned over the individual limb to be cut. A cutting blade is pivotably mounted with respect to the hook. The cutting blade is coupled to a rope through a series of pulleys. The rope extends the length of the pole so as to be grasped at ground level. Once the hook is placed over the limb, the rope is pulled downwardly, causing the cutting blade to pivot upwardly and cut the limb. The downward force exerted on the rope is amplified at cutting the blade by the effect of the pulleys. The larger the diameter of the tree limb(s) to be cut, the larger the manual pulling force on the rope required to sever the tree limb(s).

Thus, conventional pruning devices can require significant physical strength to operate. Further, physical endurance is also required if many tree limbs are to be pruned in a short period of time.

Devices have been developed to reduce the physical effort required to prune tree limbs. For example, U.S. Pat. No. 3,340,612 discloses an electric tree pruning saw having a motor at one end of a pole. Rotation of the motor is converted to rectilinear motion of a saw blade for sawing the limb. Although this device works well in cutting large tree limbs, it may not be effective in sawing smaller diameter limbs. Indeed, small diameter limbs must be firmly grasped while being pruned to avoid deflection of the limb. Further, rectilinear cutting blades may slip and damage limbs which are not intended or desired to be pruned.

SUMMARY OF THE INVENTION

An object of the invention is to provide a tree pruning device which requires minimal physical effort to operate and which can easily cut individual limbs of various diameters.

In accordance with the principles of the present invention, this objective is obtained by providing a device for pruning limbs including an elongate support member having distal and proximal ends. A cutting mechanism is pivotably mounted on the distal end of the support member and includes a cutting member. A mechanism for automatically actuating the cutting member is provided. The device further includes structure for mounting the actuating mechanism on the support member near the proximal end thereof and structure for coupling the actuating mechanism to the cutting member whereby rotational movement of the actuating mechanism pivots the cutting member from an inoperative position to an operative position.

Other objects, features and characteristics of the present invention, as well as the methods of operation and functions of the related elements of the structure, and the combination of parts and economies of manufactured, will become more apparent upon consideration of the following detailed description and appended claims with reference to the accompanying drawings, all of which form a part of this specification.

BRIEF DESCRIPTION OF THE DRAWINGS

FIG. 1 is an elevational view of a rechargeable battery-powered tree pruning device embodying the principles of the present invention;

FIG. 2 is an enlarged perspective view of a bracket for mounting a power source or motor to the tree pruning device of the invention;

FIG. 3 is an enlarged perspective view of a power source or motor mounted to the bracket of FIG. 2.

DETAILED DESCRIPTION OF THE PRESENTLY PREFERRED EXEMPLARY EMBODIMENT

Figure 4:
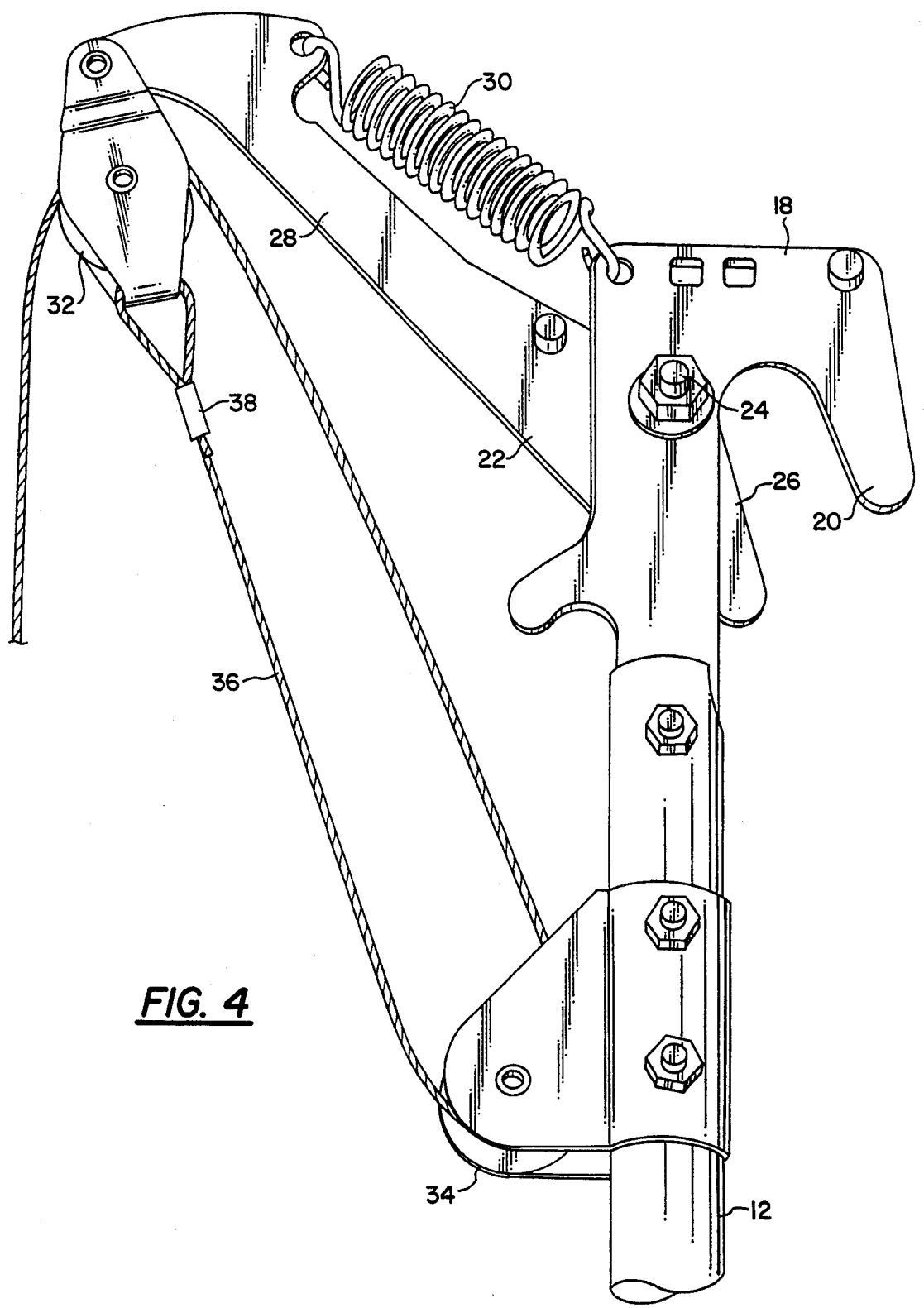
FIG. 4 is an enlarged perspective view of the cutting mechanism of the pruning device of the invention.

Referring to the drawings, a rechargeable battery powered tree pruning device is shown, generally at 10, which embodies the principles of the present invention. The device 10 includes a support member 12, a cutting mechanism 14, and a power source 16.

The support member 12 and cutting mechanism 14 are of conventional configuration which have been modified in accordance with the principles of the present invention. The support member 12 is preferably a pole or tube, and in the illustrated embodiment is approximately twelve and one-half feet in length and approximately one inch in diameter. An aluminum tube is most preferable because of its desirable low weight. Of course, the support member may be any of a variety of lengths, materials and/or may be adjustable in length. For example, if possible power line contact is a fear or reality, non-conductive material such as wood or plastic is preferable. The cutting mechanism 14 is affixed to the distal end of the support member 12 by any suitable, known means such as bolting or the like. The cutting mechanism 14 includes a stationary portion 18 defining a downwardly extending hook member 20. A cutting member 22 is pivotally coupled to the stationary portion by pin 24. The cutting member 22 includes a cutting surface 26, which pivots upwardly so as to be adjacent a counter cutting surface 25 of the stationary portion 18 when the device 10 is in the cutting position, similar to scissor-action. The cutting member 22 includes an elongated portion 28 which extends upwardly from the pivot point in an unbiased state. Spring 30 couples the stationary portion 18 to the elongated portion 28 of the cutting member to make the device 10 resilient. Thus, upon cutting a tree limb or the like, the spring permits the cutting member to return to its non-cutting position. A first pulley 32 is mounted on the end of the elongated portion 28, while a second pulley 34 is mounted on the support member 12, below the stationary portion 18 of the cutting mechanism 14.

Conventional pruning devices typically include a rope which is fixed at one end to the first pulley, looped around the second pulley 34 and then looped over the first pulley 32. The rope extends to ground level and is pulled to pivot the cutting member 22 to facilitate cutting. The conventional device has been modified in accordance with the principles of the present invention by replacing the conventional rope, preferably with a steel cable 36 of approximately 100 lb test or greater. A steel cable is preferred due to its strength and its resistance to stretching. Other cables, such as nylon, may be used provided they are of sufficient strength. End 38 of the cable is fixed to a bracket housing the first pulley 32 and the cable is looped under the second pulley 34 and then looped over the first pulley 32 (FIG. 4). The other end of the cable 36 is fixed to spool member 40, as will be described below.

The power source 16 is mounted to the support member via bracket 42, as shown in FIG. 3. In the illustrated embodiment, the bracket 42 is mounted approximately nine feet from the distal end of the support member, so as to be accessible to the operator, while providing approximately three and one-half feet of pole below bracket 42 to facilitate handling of the device 10.

Referring to FIG. 2, the bracket 42 is shown mounted to the support member 12. In the illustrated embodiment, the bracket is made from a ⅛ inch thick aluminum sheet and is secured to the support member 12 by rivets 44. An L-shaped flange 46 is riveted to one side of the support member at one leg thereof. The bracket 42 is then riveted to the other leg of flange 46, thus, rigidly securing the bracket 42 to the support member 12. Although rivets are preferably used to fasten the bracket 42 and flange 46 to the support member, other fastening devices such as screws or bolts may be used.

As shown in FIG. 2, a strap member 48, having a substantially U-shaped configuration, is mounted on the upper surface of bracket 42 along the axis of the support member 12. In the illustrated embodiment, the strap member 48 is formed from an aluminum sheet. The strap member 48 is mounted to the bracket 42 and support member via bolts 50, 52 inserted in bores provided therethrough. Bolt 50 is locked with a nut, while a spacer 54 is disposed over bolt 52 and secured with a wing-nut 56. The spacer ensures that, when tightening wing-nut 56, the wing nut does not interfere with the strap member 48. The strap member holds the power source 16 in position on the bracket 42 (FIG. 3).

In the illustrated embodiment, a second bracket 43 is securely mounted on an end of bracket 42 opposite flange 46, and an end 58 of second bracket 43 is bent so as to be disposed beneath the lower surface of bracket 42 to define a mounting area for the spool member 40 and to define guide means 60 for the cable 36. Second bracket 43 is preferably riveted to the un-bent portion of bracket 42 to provide additional rigidity. The guide means 60 has an elongated slot 64 therein. The cable 36 is disposed within the slot so that the slot limits lateral movement of the cable and thus, permits proper winding of the cable on the spool member 40, as will become apparent below.

The spool member 40 is mounted on bracket 42 via flanges 66, 68. Flange 68 is formed by bending the distal portion of the bracket upwardly so as to be perpendicular to the plane of bracket 42. Flange 66 is cut in the bracket 42 and bent upwardly so as to be parallel with flange 68. It is preferable to form flanges 66 and 68 from the bracket 42 to minimize the overall weight of the device 10. However, individual L-brackets may be mounted directly to bracket 42 to define the flanges.

In the illustrated embodiment, the spool member 40 is formed from solid aluminum approximately 1.25 inches in diameter and approximately 1.125 inches in length. An axle 70 is provided so as to extend axially through a bore in the spool member. The axle 70, preferably of a square or hexagonal cross-section, extends through bores (not shown) in flanges 66 and 68 so as to be rotatable therein. A radially extending threaded bore (not shown) is provided in the spool member so as to align with a flat portion (not shown) of the axle 70. A set screw is provided to secure the axle 70 to the spool member 40.

A recessed spindle area 72 is provided in the spool member 40 which takes-up the cable 36 upon rotation thereof. As shown in FIG. 2, the cable 36 is secured to the spool member 40. To secure the cable to the spool member, an anchoring bore (not shown) is provided in the spool member. An end of cable 36 is disposed in the anchoring bore. A second threaded bore is also provided in the spool member 40 so as to intersect the anchoring bore housing the cable 36. A set-screw is threaded into the second threaded bore to secure the cable to the spool member 40. Thus, the cable 36 extends from the cutting mechanism 14 to the spool member 40 with very little slack.

In accordance with the invention, the power source 16 is preferably a battery powered motor with a drive shaft and socket. For example, a rechargeable battery powered screwdriver, such as those manufactured by SKIL, may be advantageously used. The motor preferably operates at a minimum of 3.6 volts and 180 rpm or greater. Preferably, the power source 16 should not have an auto lock feature. Axle head 74 is a standard head which will accept conventional ¼ inch power screwdrivers. Thus, the axle head 74 is of hexagonal configuration which mates with a socket of the ¼ inch drive element 76 of the power source 16.

In mounting the power source 16 to the device, the power source 16 is inserted under strap member 48 and moved along bracket 42. The drive element 76 is coupled to the axle head 74. The strap member 48 is then secured over the body of the power source 16 by tightening wing nut 56. Spacers (not shown) may be provided to accommodate a larger power source 16.

The operation of the device 10 will be described with reference to FIGS. 1, 3 and 4. In pruning individual tree limbs, the hook member 20 is placed over the limb to be pruned. The lower end of the support member 12 is grasped with one hand. The operator then depresses switch 78 of the power source 16 to rotate the drive element 76. Since the drive element is coupled to the axle 70, the axle rotates the spool member 40 so that a portion of the cable 36 is wound circumferential surface of the spool member. Winding of the cable causes the cutting member 22 to pivot about pin 24 so that the elongated portion 28 moves downwardly extending spring 30, while cutting surface 26 moves upwardly to contact the limb to be cut. The limb is cut by the scissor action of the cutting surface 26 in cooperation with the counter cutting surface 25 of the stationary hook member 20. The pulleys 32 and 34 amplify the available force to be exerted on the limb via the cutting member 22. The switch 78 of the power source is released when the limb is cut.

In the illustrated embodiment the power source 16 has a reversible motor; therefore, switch 78 is a dual-acting switch. Thus, depressing the opposite side of the switch causes the motor to reverse and thus unwinds the cable 36 from the spool member 40 to relieve tension in the cable. Thereafter, the spring 30 returns the cutting member 22 to an unbiased position to accept another limb.

It can be appreciated that minimal physical effort is required to operate the device of the present invention. Depressing switch 78 actuates the motor to create the necessary force to cut the limb. Thus, unlike conventional devices, no manual pulling of the cable is required. In the illustrated embodiment, the power source 16 can be simply removed from bracket 42, be recharged and then remounted on bracket 42, as required.

Further, the device ensures cutting of predetermined limbs, unlike reciprocating sawing devices which may slip-off a limb intended to be cut and damage a limb not intended to be pruned.

It has thus been seen that the objects of this invention have been fully and effectively accomplished. It will be realized, however, that the foregoing preferred embodiment has been shown and described for the purposes of illustrating the structural and functional principles of the present invention and are subject to change without departure from such principles. Therefore, this invention includes all modifications encompassed within the spirit of the following claims.

What is claimed is:

1. A pruning device comprising:
   an elongate support member having distal and proximal ends;
   a cutting mechanism mounted on the distal end of the support member, said cutting mechanism including a pivotally mounted cutting member and a fixed portion, said fixed portion being constructed and arranged to at least partially surround a limb to be pruned;
   actuating means having a motor and a drive element rotated by said motor for selectively actuating said cutting member;
   means for mounting said actuating means to said support member adjacent the proximal end of said support member; and
   means for operatively coupling said actuating means to said cutting member, said coupling means including a cable having first and second ends, said first end of said cable being coupled to said cutting member, said second end of said cable being operatively coupled to said actuating means, said actuating means further including an axle and a spool member mounted an the axle for rotational movement therewith, said second end of said cable being coupled to said spool member, said spool member including a circumferential surface extending about a rotational axis of said spool member, said drive element being coupled to said axle wherein the rotation of said drive element rotates said axle and thus said spool member causing a portion of said cable to wrap around said circumferential surface of said spool member thereby rectilinearly moving said cable which in turn causes said cutting member to pivot towards said fixed portion to cut the limb.

2. The device as claimed is claim 1, wherein said motor is a reversible-direction motor.

3. The device as claimed in claim 1, wherein said motor is a portable, rechargeable, battery-powered motor.

4. (Amended) The device as claimed in claim 1, wherein said mounting means includes a bracket fixedly mounted to said support member and a strap member mounted to said bracket and in contact with a portion of said motor to removably couple said motor to said support member.

5. The device as claimed in claim 4 wherein said bracket includes means for guiding the cable.

6. (Amended) The device as claimed in claim i, wherein said mounting means includes (1) a bracket member having first and second ends, said first end of said bracket member being affixed to said support member, said spool member being mounted on said second end of said bracket member and (2) a fastening element mounted on said bracket member for coupling said motor thereto, said motor being removably mounted on said bracket member.

7. The device as claimed in claim 6 wherein said bracket member includes means for guiding the cable.

* * * * *